United States Patent
Lin et al.

(10) Patent No.: US 11,979,180 B2
(45) Date of Patent: May 7, 2024

(54) METHOD FOR DETECTING AND ATTENUATING THE IMPACT OF INTERFERENCE IN A SIGNAL OF A RADIO RECEIVER WITH MULTIPLE TUNERS

(71) Applicant: Continental Automotive Technologies GmbH, Hannover (DE)

(72) Inventors: Chao Lin, Toulouse (FR); Laurent Théry, Toulouse (FR)

(73) Assignee: Continental Automotive Technologies GmbH, Hannover (DE)

( * ) Notice: Subject to any disclaimer, the term of this patent is extended or adjusted under 35 U.S.C. 154(b) by 26 days.

(21) Appl. No.: 17/790,615

(22) PCT Filed: Dec. 29, 2020

(86) PCT No.: PCT/EP2020/087999
§ 371 (c)(1),
(2) Date: Jul. 1, 2022

(87) PCT Pub. No.: WO2021/140050
PCT Pub. Date: Jul. 15, 2021

(65) Prior Publication Data
US 2023/0043288 A1    Feb. 9, 2023

(30) Foreign Application Priority Data
Jan. 9, 2020  (FR) ........................... 2000183

(51) Int. Cl.
*H04B 1/10*   (2006.01)
*H04B 1/08*   (2006.01)

(52) U.S. Cl.
CPC ........... *H04B 1/1027* (2013.01); *H04B 1/082* (2013.01)

(58) Field of Classification Search
CPC .................................................. H04B 1/1027
(Continued)

(56) References Cited

U.S. PATENT DOCUMENTS

| 7,466,959 B2 * | 12/2008 | DeMoor | H04B 1/1027 455/48 |
| 2009/0203342 A1 | 8/2009 | Darabi | |
| 2011/0306313 A1 * | 12/2011 | Jaisimha | H04B 17/309 455/185.1 |

OTHER PUBLICATIONS

International Search Report and Written Opinion for International Application No. PCT/EP2020/087999, dated Apr. 15, 2021, with partial translation, 11 pages.
(Continued)

*Primary Examiner* — Lihong Yu
(74) *Attorney, Agent, or Firm* — BUCHANAN INGERSOLL & ROONEY PC (57) ABSTRACT

A method for detecting and attenuating the impact of interference in a signal of a radio receiver with multiple tuners. The method includes providing a first input signal $RF_1$ to a first tuner $T_1$; simultaneously providing a second input signal $RF_2$ to a second tuner $T_2$; simultaneously producing a first intermediate high injection signal $IFH_1$, by the first tuner $T_1$, using the first input signal $RF_1$ filtered on a first frequency $f_E$, and a first intermediate low injection signal $IFB_2$, by the second tuner $T_2$, using the second input signal $RF_2$ filtered on the first frequency $f_E$; comparing the first intermediate high injection signal $IFH_1$ and the first intermediate low injection signal $IFB_2$; selecting one out of the first intermediate high injection signal $IFH_1$ and the first intermediate low injection signal $IFB_2$ to be decoded by the radio receiver.

14 Claims, 7 Drawing Sheets

(58) Field of Classification Search
USPC .......................................................... 375/346
See application file for complete search history.

(56) References Cited

OTHER PUBLICATIONS

International Search Report and Written Opinion for International Application No. PCT/EP2020/087999, dated Apr. 15, 2021, 15 pages (French).

* cited by examiner

METHOD FOR DETECTING AND ATTENUATING THE IMPACT OF INTERFERENCE IN A SIGNAL OF A RADIO RECEIVER WITH MULTIPLE TUNERS

CROSS REFERENCE TO RELATED APPLICATIONS

This application is the U.S. National Phase Application of PCT International Application No. PCT/EP2020/087999, filed Dec. 29, 2020, which claims priority to French Patent Application No. 2000183, filed Jan. 9, 2020, the contents of such applications being incorporated by reference herein.

FIELD OF THE INVENTION

The present disclosure relates to a method for detecting and attenuating the impact of interference in a signal of a radio receiver with multiple tuners. The present disclosure also relates to a radio receiver with multiple tuners for implementing such a method.

BACKGROUND OF THE INVENTION

A radio receiver for a vehicle, particularly a motor vehicle, usually comprises one or more antennas that capture signals in the form of electromagnetic radio communication waves, each characterized by a range of frequencies, and convert them to electrical signals. A radio receiver may also comprise a plurality of tuners, each enabling a signal to be selected in a desired frequency channel from among the signals received by the at least one antenna.

A radio receiver tuner usually comprises a plurality of filters, and at least one mixer for combining a received radio signal with a signal of a local oscillator. An intermediate signal obtained from the tuner is subsequently demodulated and amplified in the form of an audio signal.

A modern radio receiver with multiple tuners usually comprises a large number of mixers, local oscillators and filters for processing a plurality of signals simultaneously, improving the quality of audio listening, facilitating changes or providing information to the users of the vehicle. However, the combination of these components creates interference which affects the intermediate signal produced by the tuner.

A current solution consists in separating these components into modules that are electrically and magnetically isolated from each other, and connecting them to each other with coaxial cables. However, such an arrangement has the drawback of being cumbersome and uneconomical.

Additionally, a radio receiver with multiple tuners usually comprises complex filters and mixing algorithms for the purpose of attenuating interference signals. However, such filters and algorithms are limited in their effectiveness for attenuating interference in a signal, and have the drawback of being expensive.

Furthermore, modern motor vehicles comprise an increasing number of electronic devices that may create parasitic electromagnetic waves compatible with the selected frequency ranges. These parasitic electromagnetic waves create interference that affects the acquisition of the radio signal by at least one of the one or more antennas of the vehicle.

Consequently, there is a need to improve the detection and attenuation of interference in a signal of a radio receiver.

SUMMARY OF THE INVENTION

The present disclosure is intended to improve the situation.

A method is proposed for detecting and attenuating the impact of interference in a signal of a radio receiver with multiple tuners, the method comprising the following steps:
a. providing a first input signal to a first tuner,
b. providing a second input signal to a second tuner, simultaneously with step a,
c. simultaneously producing a first intermediate high injection signal, by means of the first tuner, using the first input signal filtered on a first frequency, and a first intermediate low injection signal, by means of the second tuner, using the input signal filtered on the first frequency,
d. comparing the first intermediate high injection signal and the first intermediate low injection signal,
e. selected one out of the first intermediate high injection signal and the first intermediate low injection signal having the best quality for decoding by the radio receiver.

Thus such a method makes it possible to select an intermediate signal that has a better quality, and ultimately to reducing the impact of interference on the audio signal emitted by the radio receiver.

In particular, such a method may be used to detect and limit the impact of internal electromagnetic transmissions that create interference in at least one of the intermediate signals obtained from the tuners.

Such a method also has the advantage of reducing the overall dimensions and complexity of the radio receiver.

The term "intermediate high injection signal" is taken to mean a signal produced, notably by multiplication, by a mixer using an input signal and a local oscillator signal whose frequency is higher than the frequency of the input signal. Here, the first intermediate high injection signal is produced by mixing the first input signal with a local oscillator signal whose frequency is higher than the first frequency of the first input signal.

The term "intermediate low injection signal" is taken to mean a signal produced, notably by multiplication, by a mixer using an input signal and a local oscillator signal whose frequency is lower than the frequency of the input signal. Here, the first intermediate low injection signal is produced by mixing the second input signal with a local oscillator signal whose frequency is lower than the first frequency of the second input signal.

According to a first example, the first input signal and the second input signal are acquired by means of a single antenna.

According to a second example, the first input signal is acquired by means of a first antenna and the second input signal is acquired by means of a second antenna, the method comprising steps f and g consisting in:
f. simultaneously producing a second intermediate low injection signal, by means of the first tuner, using the first input signal filtered on a first frequency, and a second intermediate high injection signal, by means of the second tuner, using the second input signal filtered on the first frequency,
g. comparing the second intermediate low injection signal and the second intermediate high injection signal,
steps f and g being executed between steps d and e, step e consisting in selecting one out of the first intermediate high injection signal, the first intermediate low injection signal, the second intermediate low injection signal and the second intermediate high injection signal having the best quality for decoding by the radio receiver.

According to the advantageous arrangements of the second example of a method, this example makes it possible to detect when external electromagnetic transmissions affect at least one of the antennas in such a way as to create interference in one of the input signals in the vicinity of the first frequency. Thus the impact of the interference due to external electromagnetic transmissions may be limited by selecting the intermediate signal having the best quality for decoding by the radio receiver.

Here, the second intermediate low injection signal is produced by mixing the first input signal with a local oscillator signal whose frequency is lower than the first frequency of the first input signal. The second intermediate high injection signal is produced by mixing the second input signal with a local oscillator signal whose frequency is higher than the first frequency of the second input signal.

According to a first aspect of the second example of a method, step c is executed at a first instant and step f is executed at a second instant, the first and the second instant being spaced apart by a time interval during which first input signal and the second input signal are invariant, the time interval preferably being equal to 10 ms.

Such a time interval allows real-time detection of interference affecting at least one of the intermediate signals of the radio receiver. This also enables the method to be implemented while maintaining the continuity of the audio stream issuing from the radio receiver. A user of the radio receiver can then enjoy continuous uninterrupted listening.

According to an advantageous aspect of the method as described above in all its combinations, step c comprises a subsidiary step consisting in digitizing the first intermediate high injection signal and the first intermediate low injection signal.

According to an advantageous aspect of the second example of a method as described above in all its combinations, step f comprises a subsidiary step consisting in digitizing the second intermediate low injection signal and the second intermediate high injection signal.

The digital conversion of the intermediate signals from the first and second tuners enables the intermediate signals to be stored in memory. By means of the digital conversion of the intermediate signals, it is also possible to reduce, or even prevent, parasitism due to interference in the processing of the intermediate signals during steps c to e in the case of the first example and the second example.

According to an aspect of the method as described above in all its combinations, step d comprises the following substeps:
i. determining a first difference signal between a power spectral density of the first intermediate high injection signal and a power spectral density of the first intermediate low injection signal,
ii. analyzing the first difference signal.

According to an aspect of the second example of a method as described above, step g also comprises the following substeps:
i. determining a second difference signal between a power spectral density of the second intermediate low injection signal and a power spectral density of the second intermediate high injection signal,
ii. analyzing the second difference signal.

According to an advantageous aspect of the method as described above, substep ii comprises evaluating the first difference signal with respect to an interference threshold. Similarly, in the case of the second example of a method, substep ii comprises evaluating the second difference signal with respect to an interference threshold.

By evaluating the difference signals with respect to an interference threshold, it is possible to eliminate a difference between an intermediate signal obtained from the first tuner and an intermediate signal obtained from the second tuner, resulting from a residual noise intrinsic to the components of the radio receiver.

According to an advantageous aspect of the method as described above, substep ii comprises evaluating the sign of the first difference signal. Similarly, in the case of the second example of a method, substep ii comprises evaluating the sign of the second difference signal.

This makes it possible to identify which tuner is receiving internal electromagnetic transmissions, and/or which antenna is receiving external electromagnetic transmissions, as the case may be.

According to another aspect, a motor vehicle radio receiver is proposed for implementing the method as described above in all of its combinations, the radio receiver having multiple tuners, the radio receiver comprising at least a first antenna, a second antenna, and a digital central part for signal processing.

BRIEF DESCRIPTION OF THE DRAWINGS

Other features, details and advantages will become apparent from reading the following detailed description and from analyzing the appended drawings, in which.

DESCRIPTION OF THE EMBODIMENTS

The drawings and descriptions below essentially contain elements of definite character. Consequently they can be used not only to clarify the understanding of the present disclosure, but also to contribute to its definition if necessary.

In the various figures, the same references denote identical or similar elements. In the interests of brevity, only those elements that are useful for the understanding of the embodiment described are shown in the figures and described in detail below. Only the differences between the examples presented are described in detail.

Figure 1:
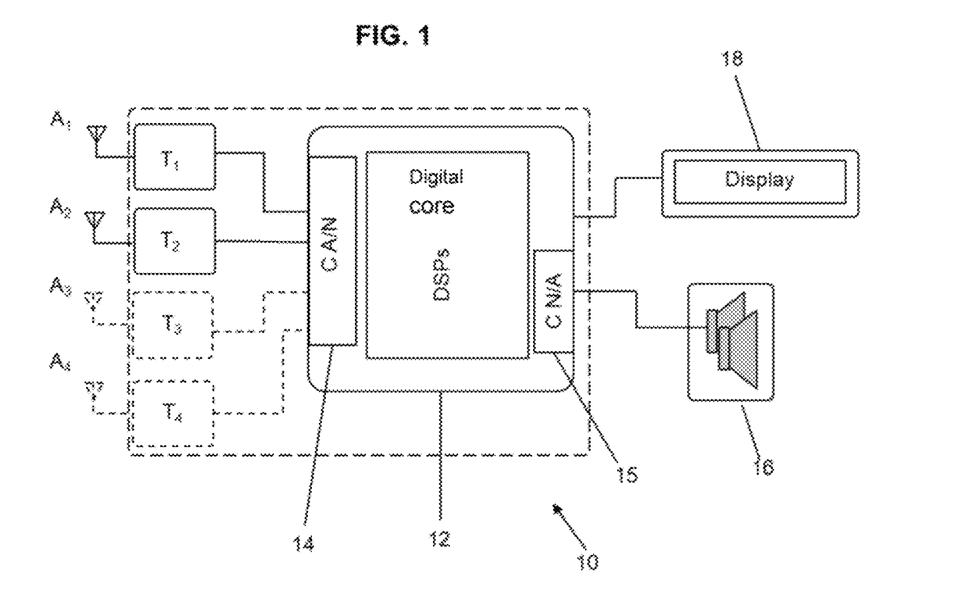
FIG. 1 shows schematically a radio receiver for a vehicle.

FIG. 1 shows schematically a radio receiver 10 for a vehicle notably a motor vehicle. The radio receiver 10 has multiple tuners, in the sense that it comprises at least two tuners. According to the example of FIG. 1, the radio receiver 10 comprises a first tuner $T_1$ connected to a first antenna $A_1$. Similarly, the radio receiver 10 comprises a second tuner $T_2$ connected to a second antenna $A_2$. According to another example described below, the first tuner $T_1$ and the second tuner $T_2$ may be connected to the same antenna. Optionally, a third tuner $T_3$ and a fourth tuner $T_4$ may be connected, respectively, to a third antenna $A_3$ and a fourth antenna $A_4$.

A tuner T is described below, this description being applicable to each tuner $T_1$, $T_2$ of the radio receiver 10 of the description. The tuner T is connected to an antenna A. The tuner T receives an input signal RF captured by the antenna A. The input signal RF comprises a large number of frequencies, each carrying information to be decoded. The tuner T may be used, in the first place, to filter the input signal RF at a selected input frequency $f_E$, the input frequency $f_E$ of the input signal RF notably carrying information to be decoded. In the rest of the description, the input frequency $f_E$ is taken to mean the frequency at which a user of the radio receiver 10 wishes to decode the information carried by the input frequency $f_E$ of the input signal. The input frequency $f_E$ may, notably, be between 88 MHz and 108 MHz, for example.

The tuner T also comprises a mixer. The mixer combines the filtered input signal RF with a local oscillator signal LO, to produce an intermediate signal IF, an intermediate frequency $f_{IF}$ of which is shifted with respect to the input frequency $f_E$. In particular, the intermediate frequency $f_{IF}$ of the intermediate signal IF is equal to the absolute value of the difference between the input frequency $f_E$ of the input signal RF and a frequency $f_{LO}$ of the local oscillator signal LO.

The frequency $f_{LO}$ of the local oscillator signal LO of the mixer is variable. The frequency $f_{LO}$ of the local oscillator signal LO may thus be controlled so as to obtain the desired intermediate frequency $f_{IF}$ of the intermediate signal IF. There are two distinct frequencies $f_{LO}$ that may be used to obtain the same desired intermediate frequency $f_{IF}$ of the intermediate signal IF.

Figure 9A:
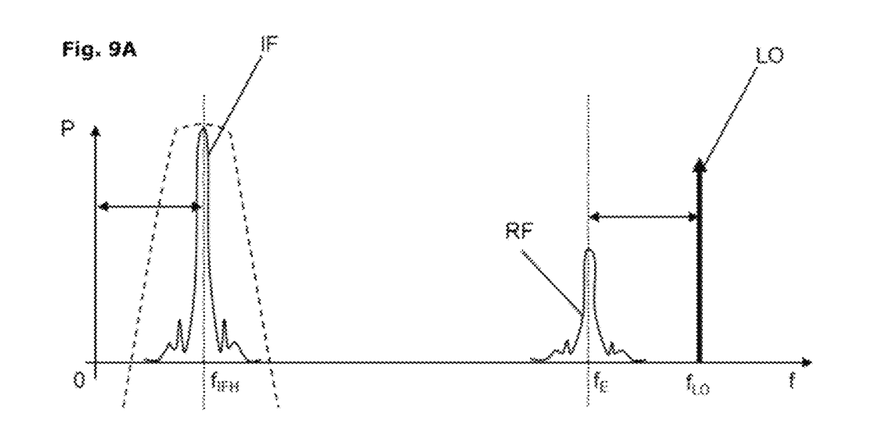
FIG. 9A shows the operation of a mixer in the case of a high injection.

In a first case, shown in FIG. 9A, the frequency $f_{LO}$ of the local oscillator signal LO is higher than the input frequency $f_E$ of the input signal RF. In the first case, the intermediate signal IF that is obtained is called the intermediate high injection signal IFH. In particular, the intermediate frequency $f_{IFH}$ of the intermediate high injection signal IFH is equal to the difference between the frequency $f_{LO}$ of the local oscillator signal LO and the input frequency $f_E$ of the input signal RF.

Figure 9B:
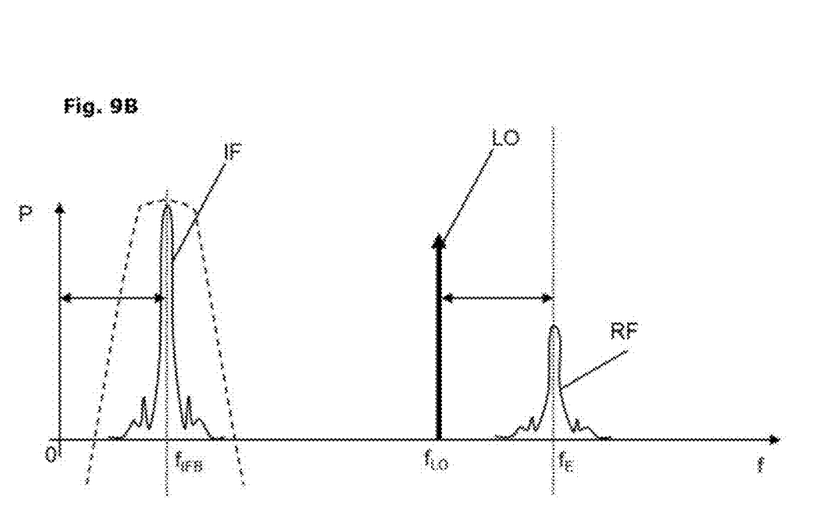
FIG. 9B shows the operation of a mixer in the case of a low injection.

In a second case, shown in FIG. 9B, the frequency $f_{LO}$ of the local oscillator signal LO is lower than the input frequency $f_E$ of the input signal RF. In the second case, the intermediate signal IF that is obtained is called the intermediate low injection signal IFB. The intermediate frequency $f_{IFB}$ of the intermediate signal IF is equal to the difference between the input frequency $f_E$ of the input signal RF and the frequency $f_{LO}$ of the local oscillator signal LO.

In the following text, unless specified otherwise, "intermediate signal IF" is taken to mean an intermediate injection signal that may equally well be high or low.

Additionally, unless indicated otherwise, the tuners $T_1$, $T_2$ are in this case parameterized so as to produce, respectively, first and second intermediate signals $IF_1$ and $IF_2$, each having an intermediate frequency $f_{IF}$ that is close to, or even identical with, the other. It is also possible to fix the intermediate frequency $f_{IF}$ of each intermediate signal $IF_1$, $IF_2$ at a standard value, for example 10.7 MHz. The processing and/or comparison of the intermediate signals $IF_1$, $IF_2$ may, notably, be facilitated by this arrangement.

With reference to FIG. 1, the radio receiver 10 further comprises a digital central part 12 with a logic control unit (digital core), and an analog downstream part with an amplifier and loudspeakers 16. An analog to digital converter 14 separates the digital central part from the tuners $T_1$, $T_2$. Similarly, a digital to analog converter 15 separates the digital central part 12 from the analog downstream part. Additionally, the audio system comprises a user interface with a display screen 18 ('Display') and a touch-sensitive surface and/or physical buttons (not shown), enabling the user to choose the input frequency $f_E$.

Figure 2:
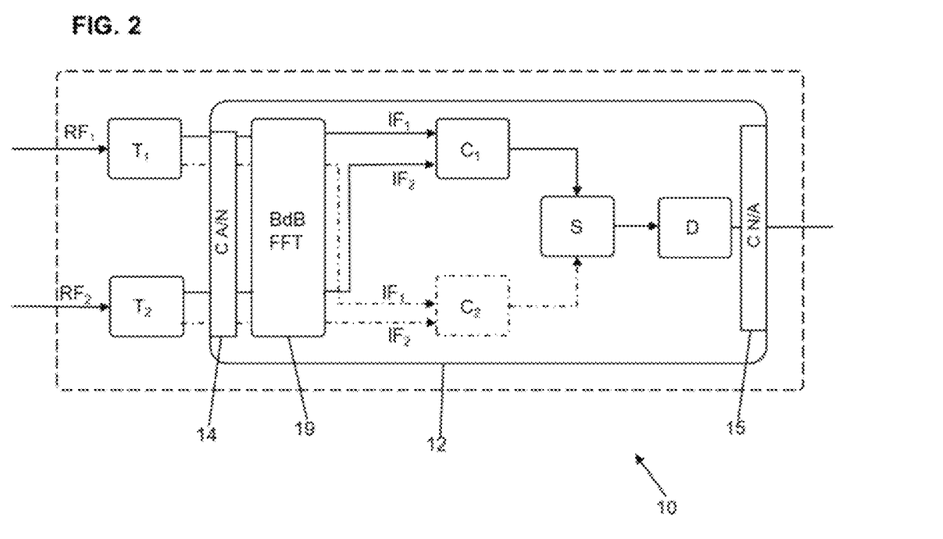
FIG. 2 shows schematically and in greater detail the radio receiver of FIG. 1.

FIG. 2 shows schematically, in greater detail, the digital central part 12 of the radio receiver 10 for implementing a method for detecting and attenuating interference, as described in detail below.

As shown in FIG. 2, the digital central part 12 comprises, notably, a first block 19 for transposing the first and second intermediate signals $IF_1$, $IF_2$, obtained from the first and second tuners $T_1$, $T_2$ respectively, to baseband. Each intermediate signal $IF_1$, $IF_2$ in baseband may then be stored in a data buffer of the first block 19. Using these stored data, a Fourier transform analysis is then performed, to produce at the output of the first block 19 a power spectral density curve representative of the first intermediate signal $IF_1$ and a power spectral density curve representative of the second intermediate signal $IF_2$.

The digital central part 12 comprises at least a first comparator block $C_1$. The digital central part 12 may also comprise a second comparator block $C_2$. Each comparator block $C_1$, $C_2$ determines a first difference signal and a second difference signal respectively. Each difference signal corresponds to a difference between the power spectral density curve representative of the first intermediate signal $IF_1$ and the power spectral density curve representative of the second intermediate signal $IF_2$.

The digital central part 12 comprises a selection block S, enabling the difference signals calculated by the comparator blocks $C_1$, $C_2$ to be analyzed subsequently. Notably, the selection block S may be used to evaluate each difference signal with respect to a predefined threshold. The selection block S may also be used to evaluate the sign of each difference signal. According to the results of the analysis of a difference signal between the intermediate signal $IF_1$ and the intermediate signal $IF_2$, the selection block S can then select one out of the intermediate signal $IF_1$ and the intermediate signal $IF_2$ to be demodulated by a demodulation block D. It is known to obtain a demodulated audio signal using such a demodulation block D. Accordingly, the demodulation block D will not be described in greater detail here.

Some or all of the operations of transposition, storage, Fourier transform, comparison, analysis, selection and demodulation may be carried out by a dedicated circuit of the DSP ("digital signal processor") type.

Figure 3:
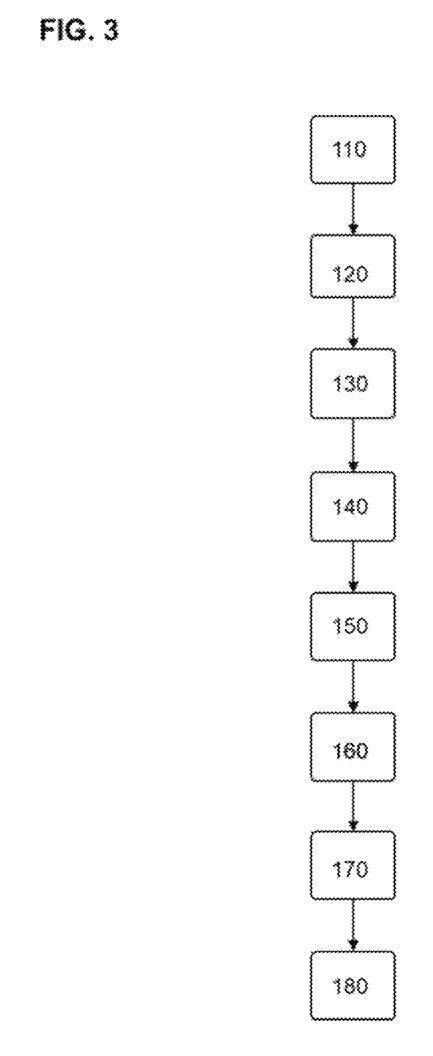
FIG. 3 shows a flow chart of a first example of a method for detecting and attenuating interference in the signal to be decoded by the radio receiver of FIGS. 1 and 2.

FIG. 3 shows a flow chart of a first example of a method for detecting and attenuating interference in the signal to be decoded by the radio receiver 10 as described above. The first example of a method in a first case is described below in greater detail with reference to FIG. 4.

A first step 110 of the first example of a method consists in acquiring electromagnetic radio communication waves using an antenna $A_1$. A first input signal $RF_1$ is thus transmitted to the first tuner $T_1$. Similarly, a second input signal $RF_2$ is transmitted to the second tuner $T_2$. For this purpose, the first tuner $T_1$ and the second tuner $T_2$ are each connected to the antenna $A_1$. The first signal $RF_1$ is therefore identical to the second signal $RF_2$. Here and in the following text, "identical" is taken to mean that the first signal $RF_1$ and the second signal $RF_2$ have the same frequency spectrum, and differ only in a residual noise intrinsic to the components of the radio receiver 10.

In a second step 120, each input signal $RF_1$, $RF_2$ is initially filtered by the tuners $T_1$, $T_2$ at the same input frequency $f_E$. The tuner $T_1$ then produces a first intermediate high injection signal $IFH_1$ from the first filtered input signal $RF_1$. Simultaneously, the tuner $T_2$ produces a first intermediate low injection signal $IFB_2$ from the second filtered input signal $RF_2$. The first intermediate high injection signal $IFH_1$ and the first intermediate low injection signal $IFB_2$ here have the same intermediate frequency $f_{IF}$. It should also be noted that the input frequency $f_E$ of the first input signal $RF_1$ carries the same information as the input frequency $f_E$ of the second input signal $RF_2$. The first intermediate high injection signal $IFH_1$ and the first intermediate low injection signal $IFB_2$ therefore each carry the same information obtained from the input signals $RF_1$ and $RF_2$.

Figure 4:
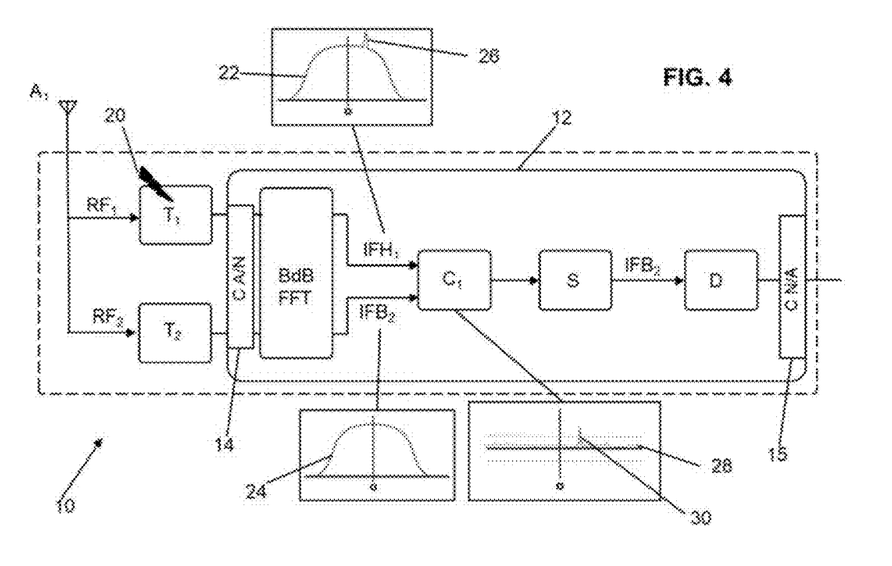
FIG. 4 shows schematically the first example of a method of FIG. 3 in a first case.

As shown in FIG. 4, the tuner $T_1$ receives internal electromagnetic transmissions 20. The internal electromagnetic transmissions 20 are transmitted by components inside the radio receiver 10. The internal electromagnetic transmissions 20 may, for example, be harmonics originating from a mixer of the second tuner $T_2$. The internal electromagnetic transmissions 20 interfere with the production of the first intermediate high injection signal $IFH_1$ by the first tuner $T_1$. For example, the internal electromagnetic transmissions 20 have a frequency close to the frequency $f_{IF}$ of the first intermediate high injection signal $IFH_1$. Interference is therefore superimposed on the first intermediate high injection signal $IFH_1$. In another case, the internal electromagnetic transmissions 20 may have a frequency close to the frequency $f_{LO}$ of the local oscillator signal LO of the first tuner $T_1$. The input signal $RF_1$ is then combined with the local oscillator signal LO that contains interference, resulting in a first intermediate high injection signal $IFH_1$ that also contains interference. The interference has a parasitic effect on the information carried by the first intermediate high injection signal $IFH_1$.

However, the first intermediate low injection signal $IFB_2$ is free of any interference in this case. The information carried by the first intermediate low injection signal $IFB_2$ is therefore unaffected.

The first intermediate high injection signal $IFH_1$ and the first intermediate low injection signal $IFB_2$ are then converted to digital signals in a third step 130.

A fourth step 140, executed by the first block 19 of the digital central part 12, then consists in transposing the first intermediate high injection signal $IFH_1$ and the first intermediate low injection signal $IFB_2$ to baseband. A first power spectral density curve 22 representative of the first intermediate high injection signal $IFH_1$ and a second power spectral density curve 24 representative of the first intermediate low injection signal $IFB_2$ are then formed.

The first curve 22 differs from the second curve 24 in that the interference creates a power excess 26 in a portion of the spectrum associated with the first intermediate high injection signal $IFH_1$. Evidently, the first curve 22 representative of the first intermediate high injection signal $IFH_1$ may have a plurality of power excesses 26, each caused by interference superimposed on the first intermediate high injection signal $IFH_1$. On the other hand, the first curve 22 and the second curve 24 are identical over the frequency ranges that are not affected by interference. It should be noted that, in the absence of interference, the first curve 22 and the second curve 24 are identical over the whole frequency domain. Here again, "identical" means that the first and second curves 22, 24 differ from each other only in the residual noise affecting the first intermediate high injection signal $IFH_1$ and/or the first intermediate low injection signal $IFB_2$.

The first intermediate high injection signal $IFH_1$ and the first intermediate low injection signal $IFB_2$ are then compared, using the first comparator block $C_1$, in a fifth step 150. Notably, the first comparator block $C_1$, establishes a first difference signal 28. The first difference signal 28 is due to the difference between the first curve 22 and the second curve 24.

The first difference signal 28 obtained by the first comparator block $C_1$ watch thus exhibits a signal that is close to, or even equal to, zero over the frequency ranges in which the first intermediate high injection signal $IFH_1$ is not affected by the interference. On the other hand, the first difference signal 28 comprises a power peak 30 corresponding to the power excess 26 associated with the interference affecting the first intermediate high injection signal $IFH_1$. Here, the power peak 30 is positive. As explained below, the power peak 30 may also be negative in other cases.

In a sixth step 160, the selection block S determines the presence of the power peak 30 by comparing the difference signal 28 with a predefined threshold. The threshold may be used, notably, to differentiate the power peak 30 from the frequency ranges in which the first difference signal 28 is close to zero but is not zero, this being due to a residual noise affecting the first intermediate high injection signal $IFH_1$ and/or the first intermediate low injection signal $IFB_2$.

The selection block S also evaluates the sign of the power peak 30 in the sixth step 160. The interference is superimposed on the first intermediate high injection signal $IFH_1$. The interference causes only a power excess 26 at its transmission frequency on the first power spectral density curve 22 of the first intermediate high injection signal $IFH_1$. Thus the interference superimposed on the first intermediate high injection signal $IFH_1$ here causes only a positive power peak 30 in the first difference signal 28. Similarly, as described below, interference superimposed on the first intermediate low injection signal $IFB_2$, conversely, causes only a negative power peak 30 in the first difference signal 28. However, this depends on the order in which the difference between the first intermediate high injection signal $IFH_1$ and the first intermediate low injection signal $IFB_2$ is established.

Consequently, the evaluation of the sign of the power peak 30 enables the selection block S to determine which of the first intermediate high injection signal $IFH_1$ and the first intermediate low injection signal $IFB_2$ is affected by interference. In the case of FIG. 4, the selection block S determines that the first intermediate high injection signal $IFH_1$ is affected by interference.

Using this information, the selection block S advantageously selects the one out of the first intermediate high injection signal $IFH_1$ and the first intermediate low injection signal $IFB_2$ that has less interference before being decoded. Thus the audio signal obtained from the selected intermediate signal is not subjected to parasitic interference. In the case of FIG. 4, the selection block S selects the first intermediate low injection signal $IFB_2$ for decoding. The first intermediate high injection signal $IFH_1$ may, however, still be used for functions of lower priority, such as an alternative frequency quality test, for example.

The first intermediate low injection signal $IFB_2$ is thus demodulated by the demodulation block D in a seventh step 170. The demodulated signal is converted to an analog signal in an eighth step 180, so that it can be sent to the amplifier and the loudspeakers 16.

Figure 5:
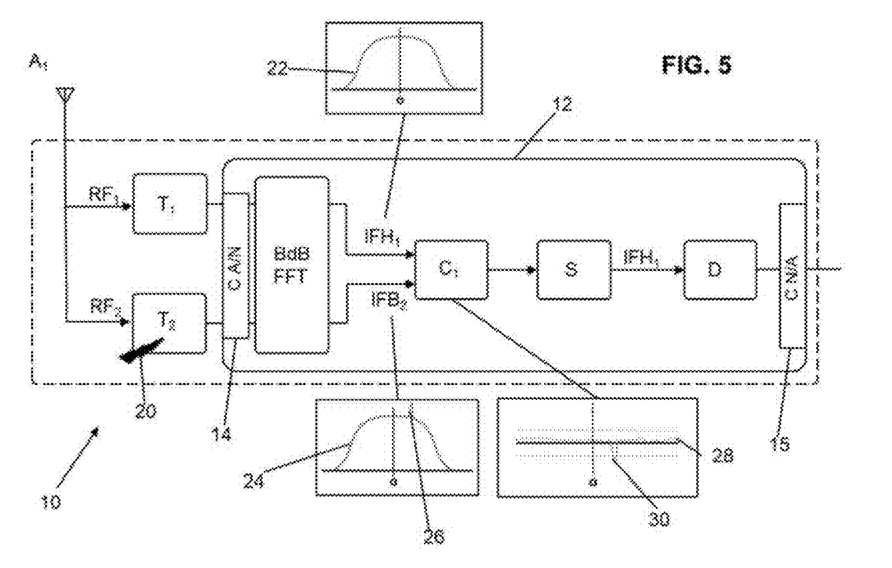
FIG. 5 shows schematically the first example of a method of FIG. 3 in a second case.

FIG. 5 shows schematically the first example of a method in a second case. The second case differs from the first case essentially in that it is the second tuner $T_2$ that receives internal electromagnetic transmissions 20. Interference is then superimposed on the first intermediate low injection signal $IFB_2$ obtained in the second step 120.

The second power spectral density curve 24 representative of the first intermediate low injection signal $IFB_2$, plotted in the fourth step 140, thus shows a power excess 26 in a portion of the spectrum associated with the first intermediate low injection signal $IFB_2$. Here, the first curve 22 is free of any interference.

The first difference signal 28 obtained in the fifth step 150 thus has a negative power peak 30. In the sixth step 160, the selection block S determines that the first intermediate low injection signal $IFB_2$ is affected by interference, and therefore selects the first intermediate high injection signal $IFH_1$ to be demodulated in the seventh step 170.

Figure 6:
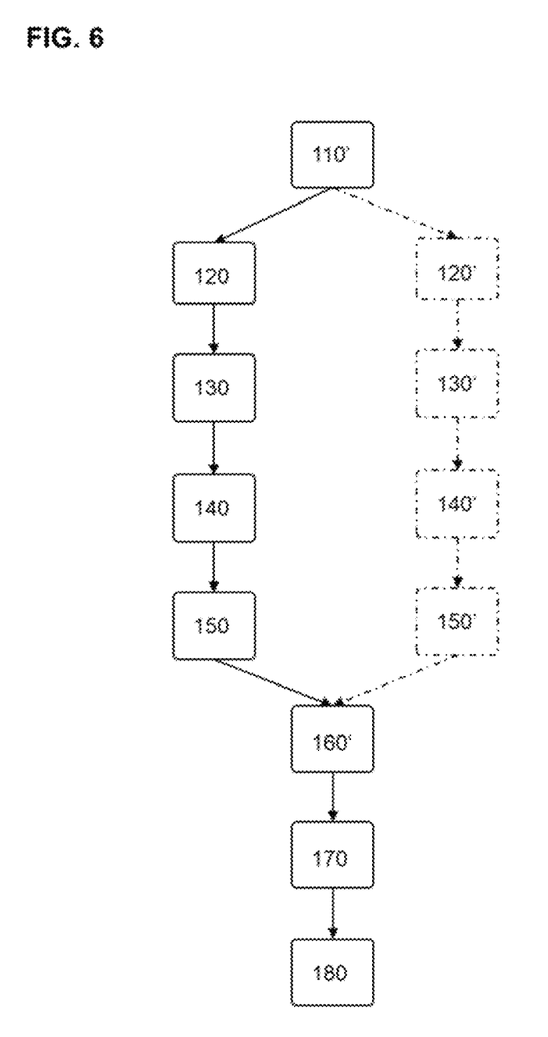
FIG. 6 shows a flow chart of a second example of a method for detecting and attenuating interference in the signal to be decoded by the radio receiver of FIGS. 1 and 2.
Figure 7:
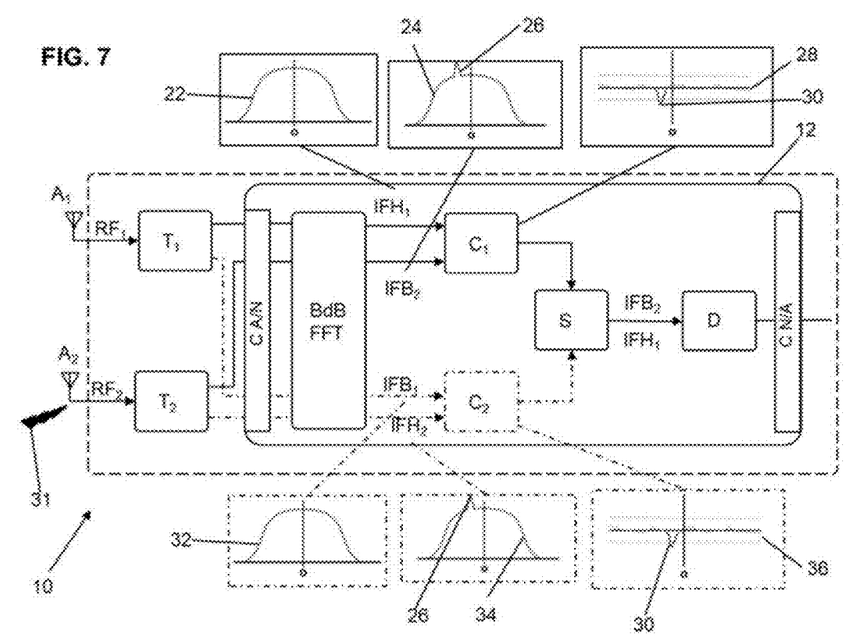
FIG. 7 shows schematically the second example of a method of FIG. 6 in a first case.
Figure 8:
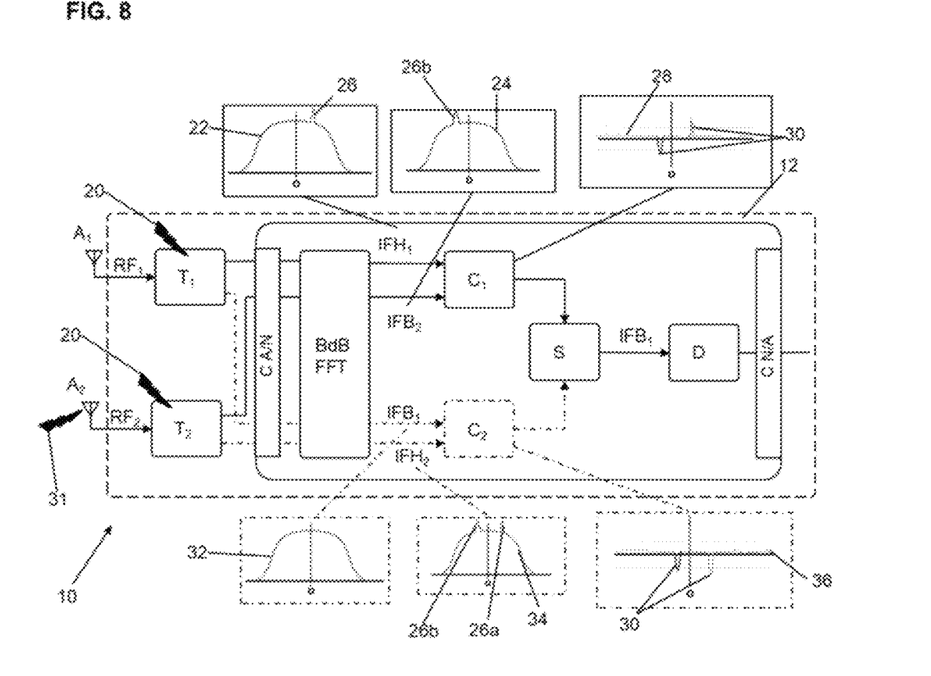
FIG. 8 shows schematically the second example of a method of FIG. 6 in a second case.

FIGS. 6 to 8 relate to a second example of a method for detecting and attenuating interference affecting the signal to be decoded by the radio receiver 10 as described above. FIG. 6 shows a flow chart of the second example of a method. Firstly, with reference to FIG. 7, a first case of the second example of a method is described below.

As shown in FIG. 7, the first tuner $T_1$ is connected to a first antenna $A_1$. Similarly, the second tuner $T_2$ is connected to a second antenna $A_2$.

The second example of a method comprises a variant first step 110'. The variant first step 110' consists in the simultaneous acquisition of a first input signal $RF_1$ via a first antenna $A_1$ and a second input signal $RF_2$ via a second antenna $A_2$. The first input signal $RF_1$ is transmitted to the first tuner $T_1$. Similarly, the second input signal $RF_2$ is transmitted to the second tuner $T_2$. The first input signal $RF_1$ and the second input signal $RF_2$ are acquired simultaneously, and therefore each carry the same information.

In the first case shown in FIG. 7, the second antenna $A_2$ receives external electromagnetic transmissions 31 transmitted by other components of the vehicle. Here, the external electromagnetic transmissions 31 have a frequency close to the input frequency $f_E$. The acquisition of the second input signal $RF_2$ by the second antenna $A_2$ is then affected by interference. Interference is superimposed on the second input signal $RF_2$, notably in the vicinity of the input frequency $f_E$. Interference then has a parasitic effect on the information carried by the input frequency $f_E$ of the second input signal $RF_2$.

On the other hand, the first antenna $A_1$ does not receive any external electromagnetic transmissions. This may be due, notably, to the fact that the first antenna $A_1$ and the second antenna $A_2$ are located in different positions on the vehicle. The signal $RF_1$ is therefore free of any interference. The information carried by the input frequency $f_E$ of the first input signal $RF_1$ is therefore unaffected.

The second example of a method comprises the second to the fifth steps 120, 130, 140, 150 as described above for the first example of a method. Here, the second step 120 is executed at a first instant t1.

As shown in FIG. 7, the second curve 24 has a power excess 26 in a portion of the spectrum associated with the first intermediate low injection signal $IFB_2$. This power excess 26 corresponds to the interference superimposed on the second input signal $RF_2$ when it is acquired by the second antenna $A_2$. The first difference signal 28 thus exhibits a negative power peak 30.

The second example of a method further comprises a variant second step 120'. The second step 120' is executed at a second instant t2. The first instant t1 and the second instant t2 are separated by a time interval $\Delta t$. In the variant second step 120', each tuner $T_1$, $T_2$ equally receives the first and second input signals $RF_1$, $RF_2$ respectively. Thus the time interval $\Delta t$ is such that each input signal $RF_1$, $RF_2$ is invariant over the time interval $\Delta t$. In other words, the frequency spectrum of each signal $RF_1$, $RF_2$ does not vary between the first instant t1 and the second instant t2. For this purpose, the time interval $\Delta t$ is less than 20 ms, preferably being equal to 10 ms.

In the variant second step 120', each input signal $RF_1$, $RF_2$ is then filtered by the respective tuners $T_1$, $T_2$ at the same input frequency $f_E$ as in the second step 120. The variant second step 120' is distinguished from the second step 120 in that a second intermediate low injection signal $IFB_1$ is obtained from the first input signal $RF_1$, and in that a second intermediate high injection signal $IFH_2$ is obtained from the second input signal $RF_2$.

The second example of a method then comprises successive variant third, fourth and fifth steps, 130', 140' and 150', following the variant second step 120'. The variant third, fourth and fifth steps 130', 140' and 150' respectively include all the operations of the third, fourth and fifth steps 130, 140 and 150 as described above, but applied to the second intermediate low injection signal $IFB_1$ and to the second intermediate high injection signal $IFH_2$.

FIG. 7 shows a third power spectral density curve 32 representative of the second intermediate low injection signal $IFB_1$ and a fourth power spectral density curve 34 representative of the first intermediate high injection signal $IFH_2$, each being produced in the variant fourth step 140'.

The fourth curve 34 exhibits a power excess 26 on a portion of the spectrum associated with the second intermediate high injection signal $IFH_2$, this power excess 26 corresponding to the interference superimposed on the second input signal $RF_2$ when it is acquired by the second antenna $A_2$.

However, the third curve 32, representative of the second intermediate low injection signal $IFB_1$, is free of any interference in this case.

The second intermediate low injection signal $IFB_1$ and the second intermediate high injection signal $IFH_2$ are then compared, using a second comparator block $C_2$, in the variant fifth step 150'. In an alternative, the second intermediate low injection signal $IFB_1$ and the second intermediate high injection signal $IFH_2$ may be compared using the first comparator block $C_1$. In this alternative, the digital central part 12 may comprise only the first comparator block $C_1$.

A second difference signal 36 obtained in the variant fifth step 150', using the second intermediate low injection signal $IFB_1$ and the second intermediate high injection signal $IFH_2$, therefore exhibits a negative power peak 30 corresponding to the power excess 26 present in the fourth curve 34.

In a variant sixth step 160', the selection block S determines that interference is superimposed on the first intermediate low injection signal $IFB_2$ and on the second intermediate high injection signal $IFH_2$. Here, the selection block S is also capable of recognizing that the first intermediate low injection signal $IFB_2$ and the second intermediate high injection signal $IFH_2$ are affected in the same way by the interference. This is because the negative power peak 30 of the first difference signal 28 is located at the same frequency as the negative power peak 30 of the second difference signal 36. Thus it may be deduced from this that the interference is due to external electromagnetic transmissions 20 affecting the acquisition of the input signal $RF_2$.

Using this information, the selection block S selects one of the first intermediate high injection signal $IFH_1$ and the second intermediate low injection signal $IFB_1$, both obtained from the first tuner $T_1$, to be demodulated.

The second example of a method then comprises the seventh and eighth steps 170 and 180 as described above for the first example of a method.

FIG. 8 shows a second case of the second example of a method. The second case of the second example of a method is distinguished from the first case of the second example of a method in that the first tuner $T_1$ and the second tuner $T_2$ are also each affected by internal electromagnetic transmissions 20.

In particular, the internal electromagnetic transmissions 20 interfere with the production of the first intermediate high injection signal $IFH_1$ by the first tuner $T_1$, in such a way that the interference is superimposed on the first intermediate high injection signal $IFH_1$. The first power spectral density curve 22 representative of the first intermediate high injection signal $IFH_1$ therefore exhibits a power excess 26 due to the internal electromagnetic transmissions 20 affecting the first tuner $T_1$. However, the third curve 32, representative of the second intermediate low injection signal $IFB_1$, also obtained from the first tuner $T_1$, is free of any interference.

Similarly, the internal electromagnetic transmissions 20 interfere with the production of the second intermediate high injection signal $IFH_2$ by the second tuner $T_2$, in such a way that the interference is superimposed on the second intermediate high injection signal $IFH_2$. The fourth power spectral density curve 34 representative of the second intermediate high injection signal $IFH_2$ therefore exhibits a first power excess 26a due to the internal electromagnetic transmissions 20 affecting the second tuner $T_2$.

The fourth curve 34 also exhibits a second power excess 26b associated with interference due to external electromagnetic transmissions 31 affecting the second input signal $RF_2$. Similarly, the second curve 24 also exhibits a power excess 26b associated with interference due to the external electromagnetic transmissions 31.

Therefore, the first difference signal 28 comprises a positive power peak 30 associated with the power excess 26 of the first curve 22 and a negative power peak 30 associated with the power excess 26b of the second curve 24. Similarly, the second difference signal 36 comprises two negative power peaks 30 associated with the first and second power excesses 26a, 26b of the fourth curve 34.

The selection block S determines, using the first difference signal 28, that interference is superimposed on the first intermediate high injection signal $IFH_1$. The selection block S also determines that the second intermediate low injection signal $IFB_1$ is free of any interference, since the second difference signal 36 does not comprise a positive power peak 30. Therefore, it may be deduced from the above that the tuner $T_1$ is affected by internal electromagnetic transmissions 20.

The first difference signal 28 and the second difference signal 36 then each have a negative power peak 30 at the same frequency. The selection block S therefore determines that the first intermediate low injection signal $IFB_2$ and the second intermediate high injection signal $IFH_2$ comprise interference originating from external electromagnetic transmissions 31 affecting the second input signal $RF_2$. The selection block S also determines that the second tuner $T_2$ is receiving internal electromagnetic transmissions 20, since the second difference signal 36 comprises a negative power peak 30 that has no equivalent in the first difference signal 28.

According to these results, the selection block S selects the second intermediate low injection signal $IFB_1$ for demodulation.

The first and second methods are not limited to the cases described above, and may be applied in numerous cases.

Furthermore, the first example of a method and/or the second example of a method may each be implemented during the use of the radio receiver 10 by a user. Notably, the audio stream emitted by the radio receiver is not affected by the implementation of any one of the first and the second examples of a method.

the first example of a method and/or the second example of a method may each be implemented repeatedly during the use of the radio receiver 10. For example, the first example of a method and/or the second example of a method may be implemented with a test recurrence of 1 s. Preferably, the first example of a method and/or the second example of a method are implemented when a user selects a new input frequency $f_E$. This limits the computation load on the digital central part 12.

The invention claimed is:

1. A method for detecting and attenuating the impact of interference in a signal of a radio receiver with multiple tuners, the method comprising:
    a. providing a first input signal radio frequency 1 ($RF_1$) to a first tuner $T_1$,
    b. providing a second input signal radio frequency 2 ($RF_2$) to a second tuner $T_2$, simultaneously with step a,
    c. simultaneously producing a first intermediate high injection signal $IFH_1$, by the first tuner $T_1$, using the first input signal $RF_1$ filtered on a first frequency $f_E$, and a first intermediate low injection signal $IFB_2$, by the second tuner $T_2$, using the second input signal $RF_2$ filtered on the first frequency $f_E$,
    d. comparing the first intermediate high injection signal $IFH_1$ and the first intermediate low injection signal $IFB_2$, by:
        i. determining a first difference signal between a power spectral density of the first intermediate high injection signal $IFH_1$ and a power spectral density of the first intermediate low injection signal $IFB_2$,
        ii. analyzing the first difference signal, and
    e. selecting one out of the first intermediate high injection signal $IFH_1$ and the first intermediate low injection signal $IFB_2$ having the best quality for decoding by the radio receiver.

2. The method as claimed in claim 1, wherein the first input signal $RF_1$ and the second input signal $RF_2$ are acquired by a single antenna $A_1$.

3. The method as claimed in claim 1, wherein step c comprises a subsidiary step consisting in digitizing the first intermediate high injection signal $IFH_1$ and the first intermediate low injection signal $IFB_2$.

4. The method as claimed in claim 1, wherein substep ii comprises evaluating the first difference signal.

5. The method as claimed in claim 4, wherein substep ii comprises evaluating the sign of the first difference signal.

6. The method as claimed in claim 1, wherein substep ii comprises evaluating the sign of the first difference signal.

7. A motor vehicle radio receiver for implementing the method as claimed in claim 1, the radio receiver having multiple tuners $T_1$, $T_2$, the radio receiver comprising at least a first antenna $A_1$ and a second antenna $A_2$ and a digital central part for signal processing.

8. A method for detecting and attenuating the impact of interference in a signal of a radio receiver with multiple tuners, the method comprising:

a. providing a first input signal radio frequency 1 ($RF_1$) to a first tuner $T_1$, the first input signal $RF_1$ acquired by a first antenna $A_1$;
b. providing a second input signal radio frequency 2 ($RF_2$) to a second tuner $T_2$, simultaneously with step a, the second input signal $RF_2$ acquired by a second antenna $A_2$;
c. simultaneously producing a first intermediate high injection signal $IFH_1$, by the first tuner $T_1$, using the first input signal $RF_1$ filtered on a first frequency $f_E$, and a first intermediate low injection signal $IFB_2$, by the second tuner $T_2$, using the second input signal $RF_2$ filtered on the first frequency $f_E$;
d. comparing the first intermediate high injection signal $IFH_1$ and the first intermediate low injection signal $IFB_2$; and
e. selecting one out of the first intermediate high injection signal $IFH_1$ and the first intermediate low injection signal $IFB_2$ having the best quality for decoding by the radio receiver;
f. simultaneously producing a second intermediate low injection signal $IFB_1$, by the first tuner $T_1$, using the first input signal $RF_1$ filtered on the first frequency $f_E$, and a second intermediate high injection signal $IFH_2$, by the second tuner $T_2$, using the second input signal $RF_2$ filtered on the first frequency $f_E$;
g. comparing the second intermediate low injection signal $IFB_1$ and the second intermediate high injection signal $IFH_2$;
steps f and g being executed between steps d and e, step e comprising selecting one out of the first intermediate high injection signal $IFH_1$, the first intermediate low injection signal $IFB_2$, the second intermediate low injection signal $IFB_1$ and the second intermediate high injection signal $IFH_2$ having the best quality for decoding by the radio receiver.

9. The method as claimed in claim 8, wherein step c is executed at a first instant t1, step f is executed at a second instant t2, the first instant t1 and the second instant t2 being spaced apart by a time interval Δt during which the first input signal $RF_1$ and the input signal $RF_2$ are invariant, the time interval preferably being equal to 10 ms.

10. The method as claimed in claim 8, wherein step c comprises a subsidiary step consisting in digitizing the first intermediate high injection signal $IFH_1$ and the first intermediate low injection signal $IFB_2$, and step f comprising a subsidiary step consisting in digitizing the second intermediate low injection signal $IFB_1$ and the second intermediate high injection signal $IFH_2$.

11. The method as claimed in claim 8, wherein step d comprises the following substeps:
  i. determining a first difference signal between a power spectral density of the first intermediate high injection signal $IFH_1$ and a power spectral density of the first intermediate low injection signal $IFB_2$, and
  ii. analyzing the first difference signal, and
wherein step g also comprises the following substeps:
  i. determining a second difference signal between a power spectral density of the second intermediate low injection signal $IFB_1$ and a power spectral density of the second intermediate high injection signal $IFH_2$, and
  ii. analyzing the second difference signal.

12. The method as claimed in claim 11, wherein each substep ii comprises evaluating the first difference signal, and the second difference signal, with respect to an interference threshold.

13. The method as claimed in claim 12, wherein each substep ii comprises evaluating the sign of the first difference signal, and the sign of the second difference signal.

14. The method as claimed in claim 11, wherein each substep ii comprises evaluating the sign of the first difference signal, and the sign of the second difference signal.

* * * * *